United States Patent
Stark et al.

(10) Patent No.: US 11,725,615 B2
(45) Date of Patent: Aug. 15, 2023

(54) SECONDARY FILTER ELEMENT AND FILTER ARRANGEMENT

(71) Applicant: MANN+HUMMEL GmbH, Ludwigsburg (DE)

(72) Inventors: Dennis Stark, Mauer (DE); Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 103 days.

(21) Appl. No.: 17/143,455

(22) Filed: Jan. 7, 2021

(65) Prior Publication Data

US 2021/0131389 A1 May 6, 2021

Related U.S. Application Data

(63) Continuation of application No. PCT/EP2019/066684, filed on Jun. 24, 2019.

(30) Foreign Application Priority Data

Jul. 9, 2018 (DE) .......................... 102018116506.4

(51) Int. Cl.
*F02M 35/02* (2006.01)
*F02M 35/024* (2006.01)

(52) U.S. Cl.
CPC .. *F02M 35/02483* (2013.01); *F02M 35/0201* (2013.01); *F02M 35/0212* (2013.01); *F02M 35/02416* (2013.01); *F02M 35/0245* (2013.01)

(58) Field of Classification Search
CPC ......... F02M 35/02483; F02M 35/0201; F02M 35/0212; F02M 35/02416; F02M 35/0245;
(Continued)

(56) References Cited

U.S. PATENT DOCUMENTS 6,572,667 B1 * 6/2003 Greif ...................... B01D 46/64
55/447
7,828,870 B1 * 11/2010 Rech .................... B01D 46/521
55/498

(Continued)

FOREIGN PATENT DOCUMENTS

DE 102013014507 A1 * 3/2015 ......... B01D 46/0046
DE 102016004317 A1 10/2017
(Continued)

*Primary Examiner* — Hung Q Nguyen

(57) ABSTRACT

A secondary filter element for a filter arrangement is provided with a filter medium and a circumferentially extending sealing device that seals the secondary filter element in respect to a filter receptacle of the filter arrangement. The circumferentially extending sealing device has an oval geometry with a long side and a short side. The circumferentially extending sealing device has an outer surface projecting, in a radial direction of the secondary filter element, farther past the filter medium when viewed along the short side compared to when viewed along the long side. A filter arrangement has a filter receptacle. A main filter element is received in the filter receptacle, and a secondary filter element is received in the main filter element. The circumferentially extending sealing device of the secondary filter element projects in a radial direction of the secondary filter element outwardly past an interior of the main filter element.

11 Claims, 17 Drawing Sheets

(58) Field of Classification Search
CPC ............... F02M 35/0216; B01D 46/64; B01D 2265/06; B01D 2271/027; B01D 2275/208; B01D 2279/60; B01D 46/2411
See application file for complete search history.

(56) References Cited

U.S. PATENT DOCUMENTS

| | | |
|---|---|---|
| 9,925,485 B2 | 3/2018 | Campbell et al. |
| 2006/0086075 A1 | 4/2006 | Scott et al. |
| 2006/0107638 A1* | 5/2006 | Holzmann ............ B01D 46/64 |
| | | 55/498 |
| 2010/0242423 A1* | 9/2010 | Morgan ................ B01D 46/58 |
| | | 156/304.3 |
| 2016/0296867 A1* | 10/2016 | Stark ............... F02M 35/02483 |
| 2016/0296868 A1* | 10/2016 | Stark .................. B01D 46/2414 |
| 2019/0070548 A1 | 3/2019 | Franz et al. |
| 2020/0038795 A1* | 2/2020 | Adamek ............ B01D 46/2414 |

FOREIGN PATENT DOCUMENTS

| | | | | |
|---|---|---|---|---|
| EP | 1201289 A1 * | 5/2002 | ........... | B01D 29/114 |
| EP | 1216743 A1 * | 6/2002 | ............. | B01D 45/16 |
| WO | 2019113152 A1 | 6/2019 | | |

\* cited by examiner

SECONDARY FILTER ELEMENT AND FILTER ARRANGEMENT

CROSS-REFERENCE TO RELATED APPLICATIONS

This application is a continuation application of international application No. PCT/EP2019/066684 having an international filing date of 24 Jun. 2019 and designating the United States, the international application claiming a priority date of 9 Jul. 2018 based on prior filed German patent application No. 10 2018 116 506.4, the entire contents of the aforesaid international application and the aforesaid German patent applications being incorporated herein by reference.

BACKGROUND OF THE INVENTION

The present invention concerns a secondary filter element for a filter arrangement and a filter arrangement with such a secondary filter element.

Known air filter arrangements for vehicles, in particular in the field of agricultural commercial vehicles and construction vehicles, can comprise a main filter element received in a filter receptacle and a secondary filter element received in the main filter element. Such a secondary filter element serves in particular as a safety means in the cases in which an operator, while the internal combustion engine is running, opens the filter receptacle and removes the main filter element, for example, for dust removal or exchange. The secondary filter element prevents that the internal combustion engine with the main filter element removed sucks in particles, for example, dust or sand.

EP 3 085 428 A1 discloses a filter arrangement with a main filter element and a secondary filter element received in the main filter element. The main filter element comprises in its length direction an oval cross section and comprises a circumferentially extending sealing device for sealing the main filter element in respect to the filter receptacle. The secondary filter element comprises also an oval cross section with a circumferentially extending sealing device.

SUMMARY OF THE INVENTION

In view of this background, the present invention has the object to provide an improved filter element.

Accordingly, a filter element, in particular a secondary filter element, for a filter arrangement is proposed. The filter element comprises a filter medium and a circumferentially extending sealing device for sealing the filter element with respect to a filter receptacle for the filter element, wherein the sealing device comprises an oval geometry with a long side and a short side, and wherein an outer surface of the sealing device projects radially farther past the filter medium when viewed along the short side compared to when viewed along the long side.

The filter element is preferably an air filter element for filtering intake air for an internal combustion engine. Preferably, the filter element is used in motor vehicles, trucks, construction vehicles, watercraft, rail vehicles, agricultural machines or vehicles, or aircraft. The filter element is preferably an auxiliary filter element, auxiliary element, secondary filter element or secondary element of the filter arrangement or can be referred to as such. The filter arrangement furthermore comprises preferably a main filter element, main element, primary filter element or primary element in which the secondary filter element is received. The main filter element can also be referred to as first filter element of the filter arrangement and the secondary filter element can also be referred to as second filter element of the filter arrangement.

The filter element comprises preferably a filter medium in the form of a filter paper, a woven filter material, a laid filter material, or a filter nonwoven. In particular, the filter medium can be produced by a spunbond or melt-blown method or can comprise such a fiber layer which is applied onto a nonwoven or cellulose carrier. Moreover, the filter medium can be felted or needled. The filter medium can comprise natural fibers, such as cellulose or cotton, or synthetic fibers, for example, of polyester, polyvinyl sulfate or polytetrafluoroethylene. The filter medium is preferably not folded, but flat.

The sealing device is preferably resiliently deformable. The sealing device extends preferably completely about the filter element and comprises, in addition to the outer surface, an inner surface which is facing away from the outer surface. By means of the inner surface, the filter medium can be sealed radially with respect to a seal contact surface of an engagement region of the filter receptacle. "Radial" is to be understood herein as a direction which is oriented away from a center axis of the filter element. This means that the filter element comprises a radial direction that is oriented perpendicularly to the center axis and is oriented away from the latter. The center axis extends in this context in particular parallel to a length direction of the filter element. Preferably, the center axis extends through a point of intersection of the long side and the short side.

The sealing device comprises in particular, viewed in length direction, an oval geometry or an oval cross section. "Oval" can be understood herein as a geometry or shape with non-concave, flat outer contour. In particular, this geometry can be formed continuously of convex and straight sections, preferably exclusively of convex sections. In particular, "oval" can be understood, for example, also as a rectangular cross section with rounded corners, an elliptical cross section or a cross section which is formed of a plurality of circular arcs. Preferably, an oval outer contour or an oval cross section is used which comprises a center point and two symmetry axis that intersect thereat. The symmetry axes comprise in particular the long side and the short side. The symmetry axes can also be referred to as major axis and minor axis. In particular, the aforementioned long side corresponds to the main axis and the short side corresponds to the minor axis. The long side is arranged perpendicularly to the short side and in particular cuts it in half. In reverse, the short side also cuts in half the long side. That the outer surface of the sealing device projects radially farther past the filter medium when viewed along the short side compared to when viewed along the long side, is to be understood particularly such that the outer surface projects farther past the filter medium when viewed in a direction oriented parallel to the short side compared to when viewed in a direction oriented parallel to the long side.

Since the outer surface of the sealing device projects past the filter medium, an outflow cross section of the filter element, in comparison to a filter element without a sealing device designed in this way, can be enlarged because the sealing device does not constrict it. Moreover, a radius of curvature of the sealing device can be optimized whereby an improved, in particular radial, sealing action with respect to the filter receptacle can be achieved.

In embodiments, the filter element comprises moreover a central tube for support of the filter medium, wherein the sealing device is connected to the central tube and wherein a first cross section surface of the filter element, delimited by an inner surface of the sealing device, is larger than a second cross section surface of the filter element, delimited by an inner contour of the central tube. The second cross section surface can be referred to also as outflow surface or outflow cross section of the filter element. Since the first cross section surface is larger than the second cross section surface, the sealing device does not constrict the outflow cross section of the filter element.

In embodiments, the inner surface of the sealing device projects radially farther past the inner contour of the central tube when viewed along the short side compared to when viewed along the long side. In particular, the inner surface, viewed along the short side as well as viewed along the long side, projects radially past the inner contour of the central tube, wherein the inner surface however projects farther viewed along the short side. In this way, a constriction of the outflow cross section of the filter element is avoided.

In embodiments, the central tube comprises a support section for supporting the filter medium, a sealing section with which the sealing device is connected, and a connecting section arranged between the support section and the sealing section and, beginning at the sealing section, tapering conically in the direction toward the support section. The support section is preferably grid-shaped and not fluid-permeable. For example, the filter medium can be wound onto the support section. The sealing section comprises preferably an oval geometry and extends circumferentially completely about the filter element. The sealing device can be, for example, cast onto the sealing section. The sealing device can be manufactured, for example, from polyurethane foam. The connecting section connects the support section with the sealing section as one piece, in particular monolithically. The central tube is preferably an injection molded plastic component.

In embodiments, the sealing device comprises two first curved sections that are positioned opposite each other and two second curved sections that are positioned opposite each other, wherein a radius of curvature of the second curved sections is larger than a radius of curvature of the first curved sections. The radius of curvature of the second curved sections can tend toward infinity. This means that the radius of curvature of the second curved sections can also be embodied at least approximately straight. In particular, the curved sections are connected to each other as one piece, in particular monolithically. Preferably, the first curved sections are positioned mirror-symmetrically with respect to the short side, and the second curved sections are positioned preferably mirror-symmetrically with respect to the long side.

In a particularly preferred embodiment, the sealing device comprises a substantially stadium-like geometry. It has been found to be advantageous that the sealing device comprises in particular no straight sections, but only curved sections. Since the sealing device is substantially comprised exclusively of curved sections, a constant contact pressure against the engagement region of the filter receptacle can be achieved about its entire circumference. The sealing device is preferably configured to seal the filter element with respect to the filter receptacle radially inwardly. Stronger curvatures or smaller radii at the sealing device are more advantageous in case of radial sealing action in inward or outward direction than weaker curvatures or larger radii because with increasing curvature the risk decreases that the sealing device upon vibration load loses contact with respect to the seal contact surface at the filter receptacle. The sealing device can alternatively or additionally also be configured to axially seal the filter element with respect to the filter receptacle. "Axial" is to be understood herein as a direction which is oriented axially toward a fluid outlet of the filter receptacle.

In embodiments, the first curved sections are correlated with the long side wherein the second curved sections are correlated with the short side and wherein the second curved sections project radially farther past the filter medium viewed along the short side than the first curved sections viewed along the long side. That the first curved sections are correlated with the long side is to be understood in particular such that the curvature center points of the first curved sections are arranged on the long side. Correspondingly, curvature center points of the second curved sections are positioned in particular on the short side.

Moreover, a filter arrangement is proposed comprising a filter receptacle, a filter element received in the filter receptacle, in particular a main filter element that comprises a filter medium and a circumferentially extending sealing device for sealing the filter element with respect to the filter receptacle, and an additional filter element received in the filter element, in particular a secondary filter element that comprises a sealing device for sealing the additional filter element with respect to the filter receptacle, wherein the sealing device of the additional filter element projects radially past the interior of the filter element that is delimited by the inner wall surface of the filter medium or a central tube of the filter element. This means that the sealing device projects radially at least past the inner side of the open end disk (i.e., the opening delimited by the open end disk) and preferably at least past a central tube of the filter element, if it is present, and past the inner wall surface of the filter medium of the filter element when no central tube is present. Of course, the sealing device can also project additionally radially past the inner wall surface of the filter medium when the filter element comprises a central tube. The main filter element can also be referred to as first filter element and the secondary filter element can be referred to also as second filter element. In particular, the secondary filter element is received in the main filter element. In the following, the main filter element is referred to as filter element and the secondary filter element as additional filter element. Since the sealing device of the additional filter element projects radially past the filter medium of the filter element, an outflow cross section of the filter element is advantageously not constricted by the sealing device of the additional filter element. That the sealing device of the additional filter element projects radially past the interior of the filter element, is to be understood in particular such that the sealing device projects past an inner wall surface of the filter medium and/or a central tube of the filter element (if present). The sealing device preferably does not project past an outer wall surface of the filter medium of the filter element.

In embodiments, the sealing device of the additional filter element comprises an oval geometry with a long side and a short side, wherein an outer surface of the sealing device of the additional filter element projects radially farther past the filter element of the main filter element when viewed along the short side compared to when viewed along the long side. This means in particular that the sealing device of the additional filter element overlaps at least partially the sealing device of the main filter element.

In embodiments, the sealing device of the additional filter element is arranged completely outside of the filter medium of the main filter element. In particular, viewed in a length direction of the filter receptacle, the sealing device of the additional filter element is positioned adjacent to the filter medium of the filter element.

In embodiments, the sealing device of the filter element and the sealing device of the additional filter element seal radially with respect to the filter receptacle, wherein the sealing device of the additional filter element at least in sections is arranged inside of the sealing device of the filter element. In particular, the sealing device of the filter element completely surrounds circumferentially the sealing device of the additional filter element. This means that, viewed in axial direction, the sealing device of the additional filter element at least in sections is arranged at the same level as the sealing device of the filter element.

In embodiments, the sealing device of the main filter element and the sealing device of the secondary filter element extend parallel to each other. Preferably, in this context the sealing surfaces, i.e., in an embodiment as a radial seal regularly the inner surfaces, are arranged to extend parallel to each other. Parallel extending is to be understood herein such that, viewed along a center axis, the annular extensions of the sealing devices or sealing surfaces are circumferentially extending parallel to each other about the center axis.

BRIEF DESCRIPTION OF THE DRAWINGS

In the Figures, same or functionally the same elements, if nothing to the contrary is indicated, have been provided with the same reference characters.

DESCRIPTION OF PREFERRED EMBODIMENTS

Figure 1:
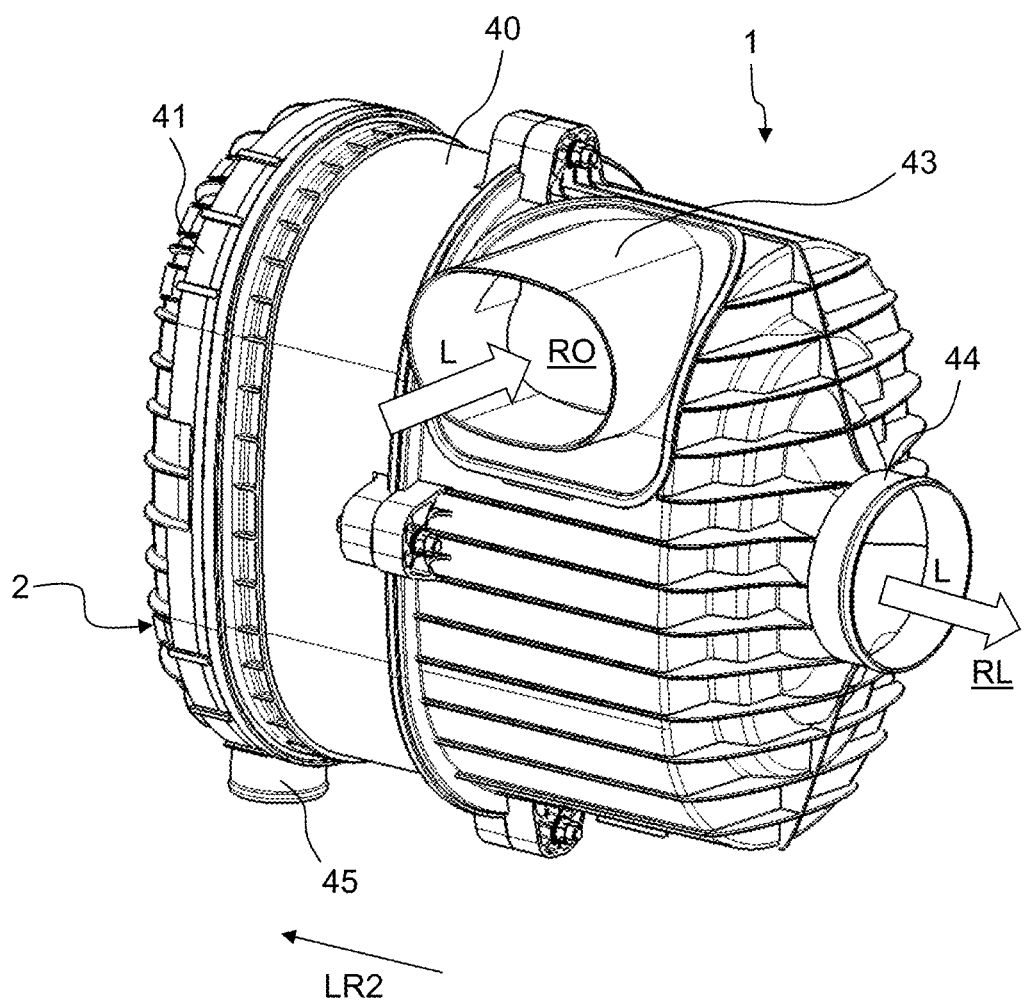
FIG. 1 shows a schematic perspective view of an embodiment of a filter arrangement, shown here in an upright arrangement with the particle discharge opening at the short side.
Figure 2:
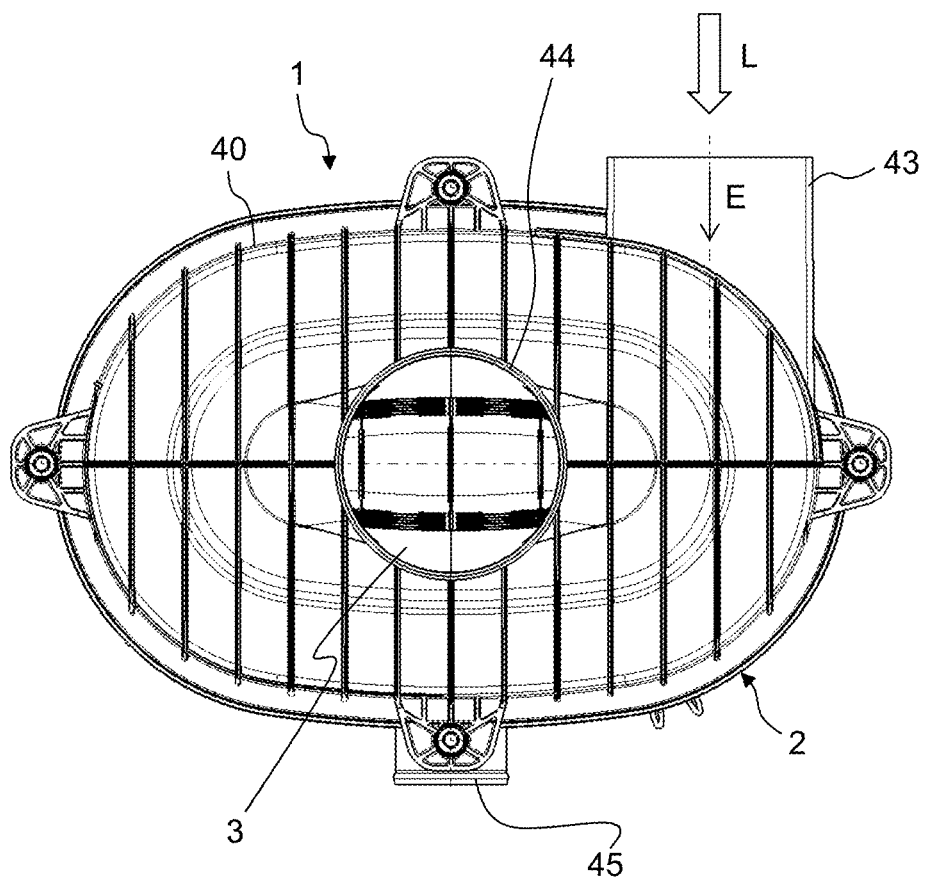
FIG. 2 shows a schematic front view of the filter arrangement according to FIG. 1, now in a horizontal filter arrangement with the particle discharge opening at the long side.
Figure 3:
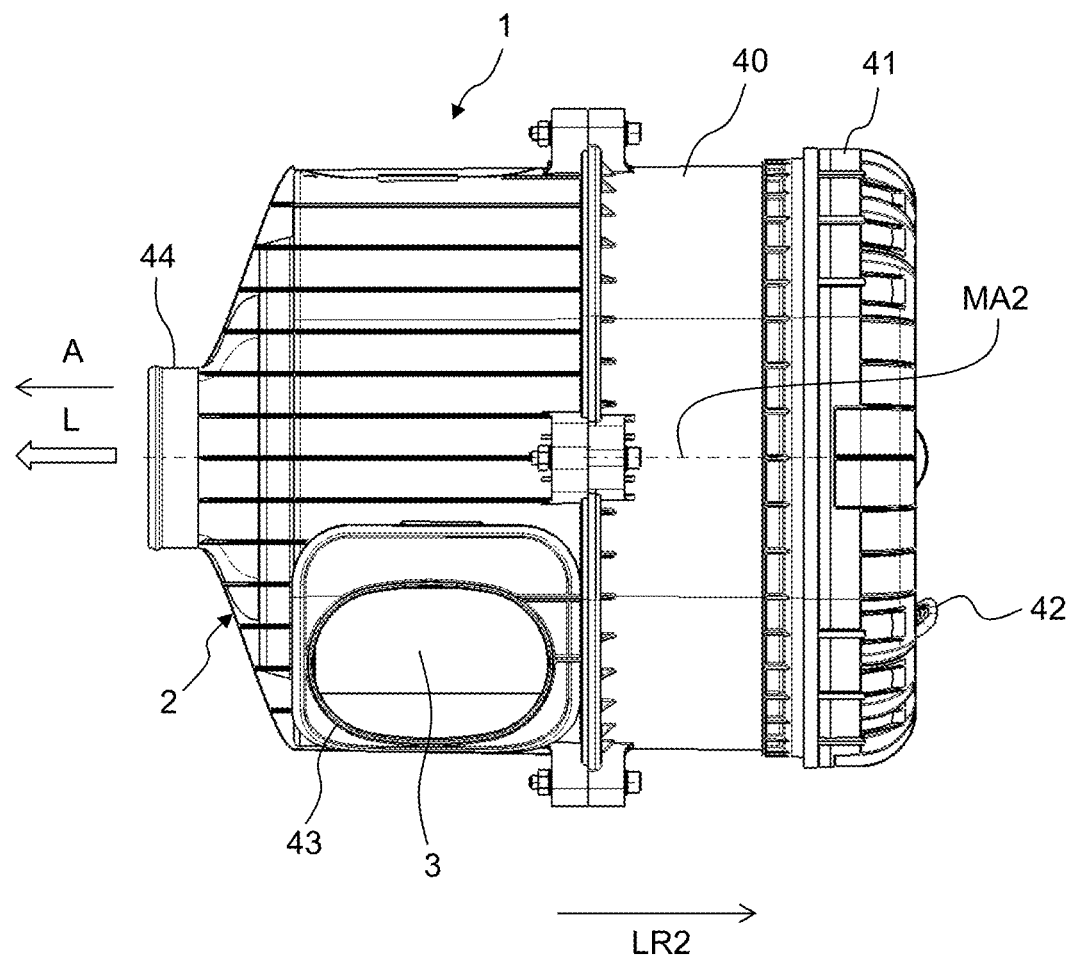
FIG. 3 shows a schematic top view of the filter arrangement according to FIG. 1 in the horizontal arrangement of FIG. 2.
Figure 4:
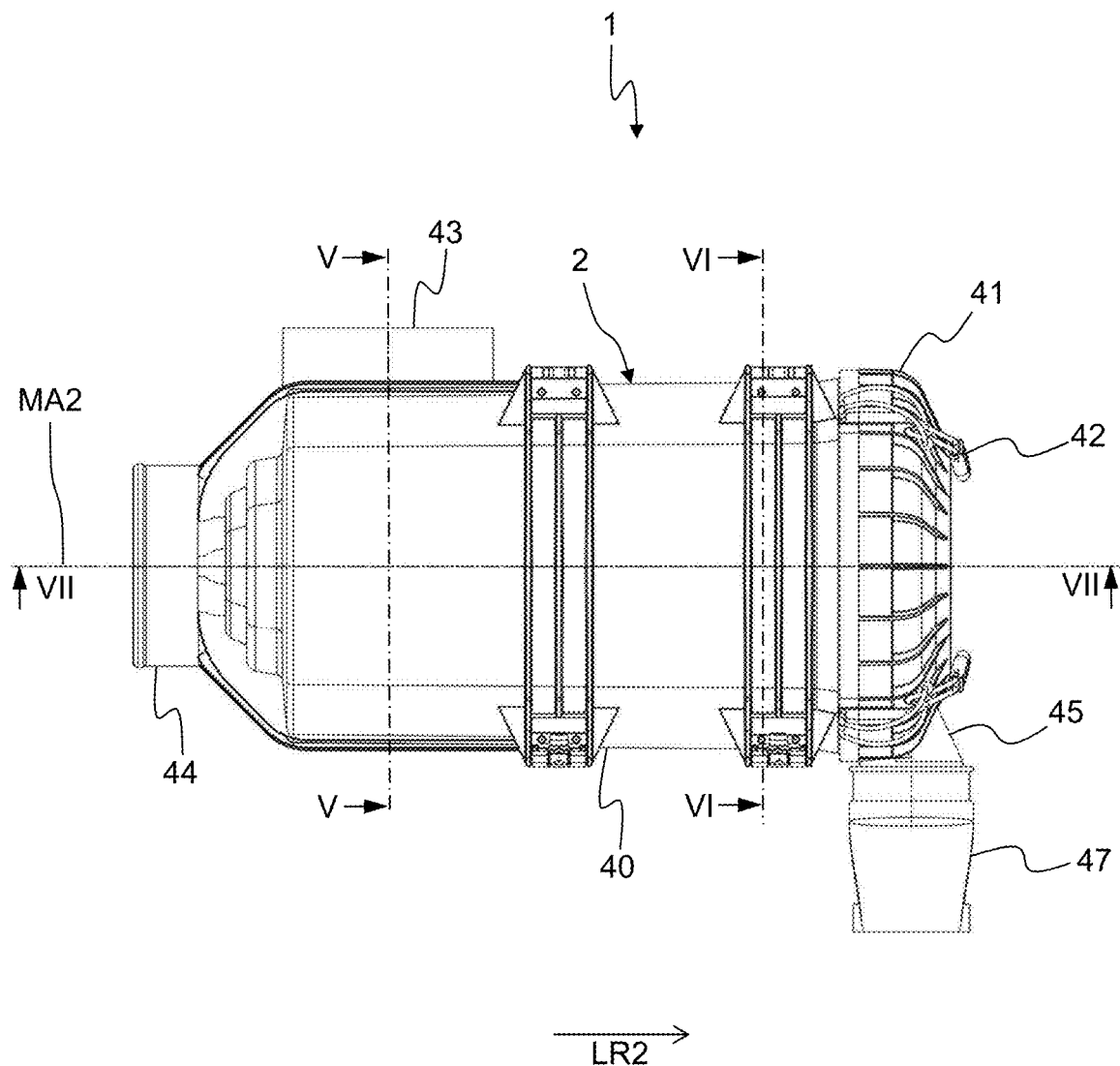
FIG. 4 shows a further schematic side view of the filter arrangement according to FIG. 1 in the horizontal arrangement of FIG. 2.
Figure 5:
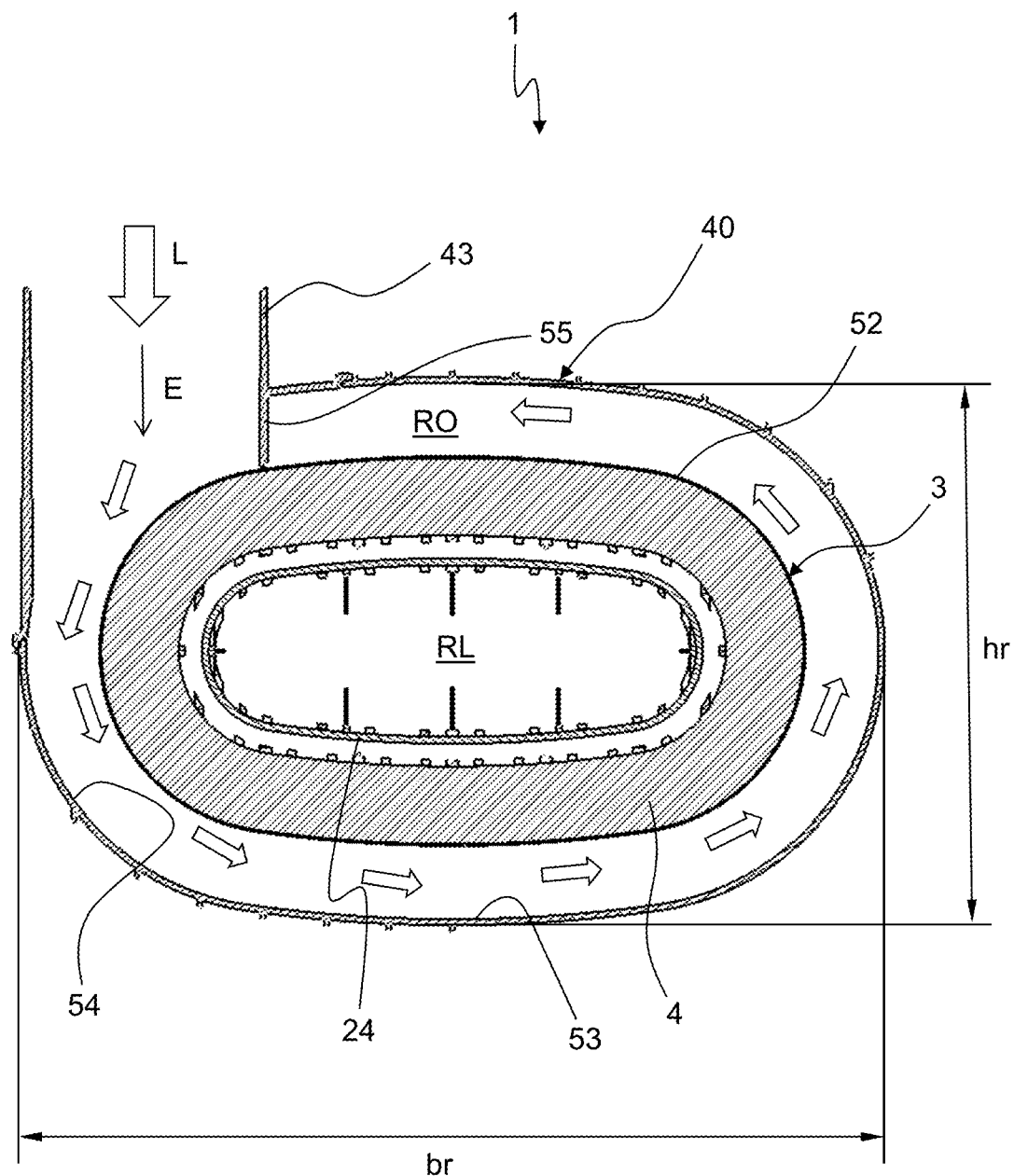
FIG. 5 shows a schematic section view of the filter arrangement according to the section line V-V of FIG. 4.
Figure 6:
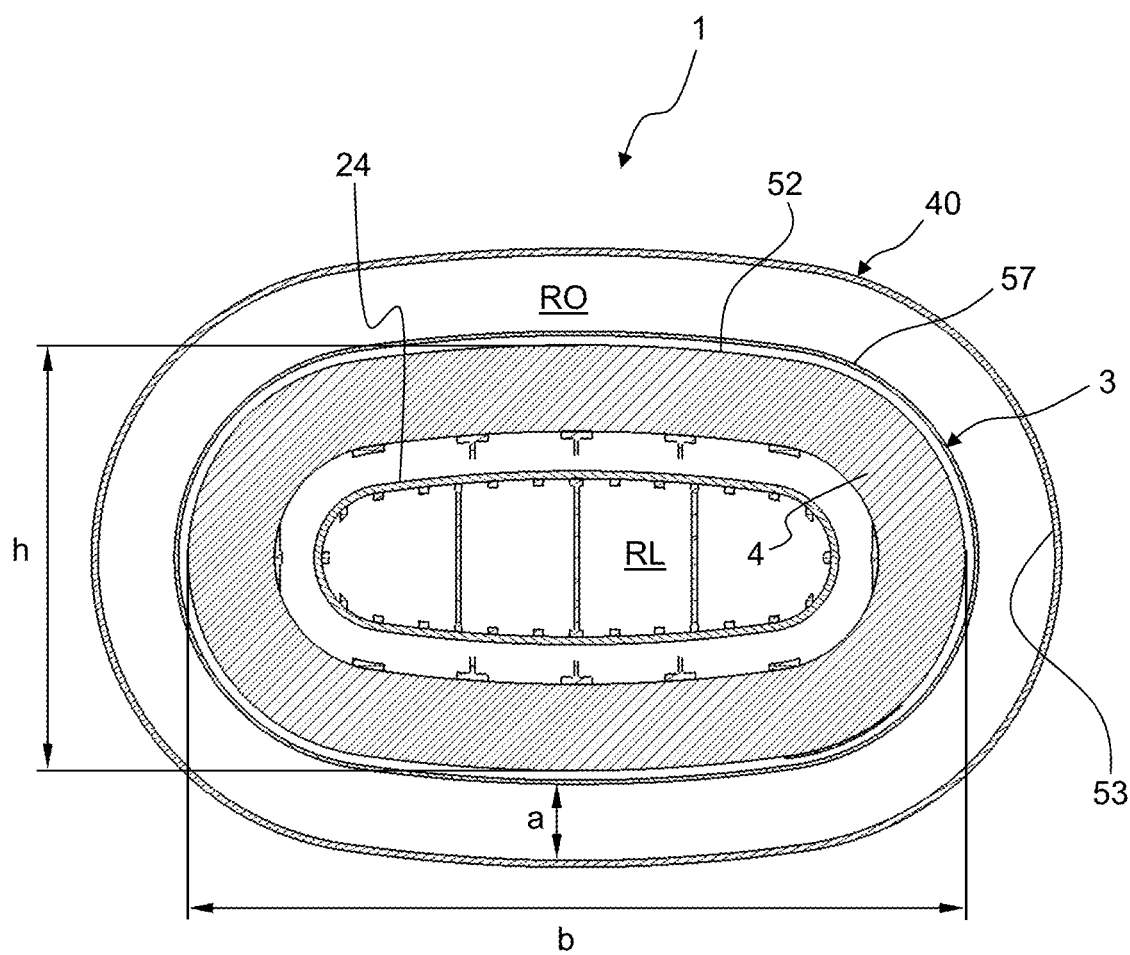
FIG. 6 shows a further schematic section view of the filter arrangement according to the section line VI-VI of FIG. 4.
Figure 7:
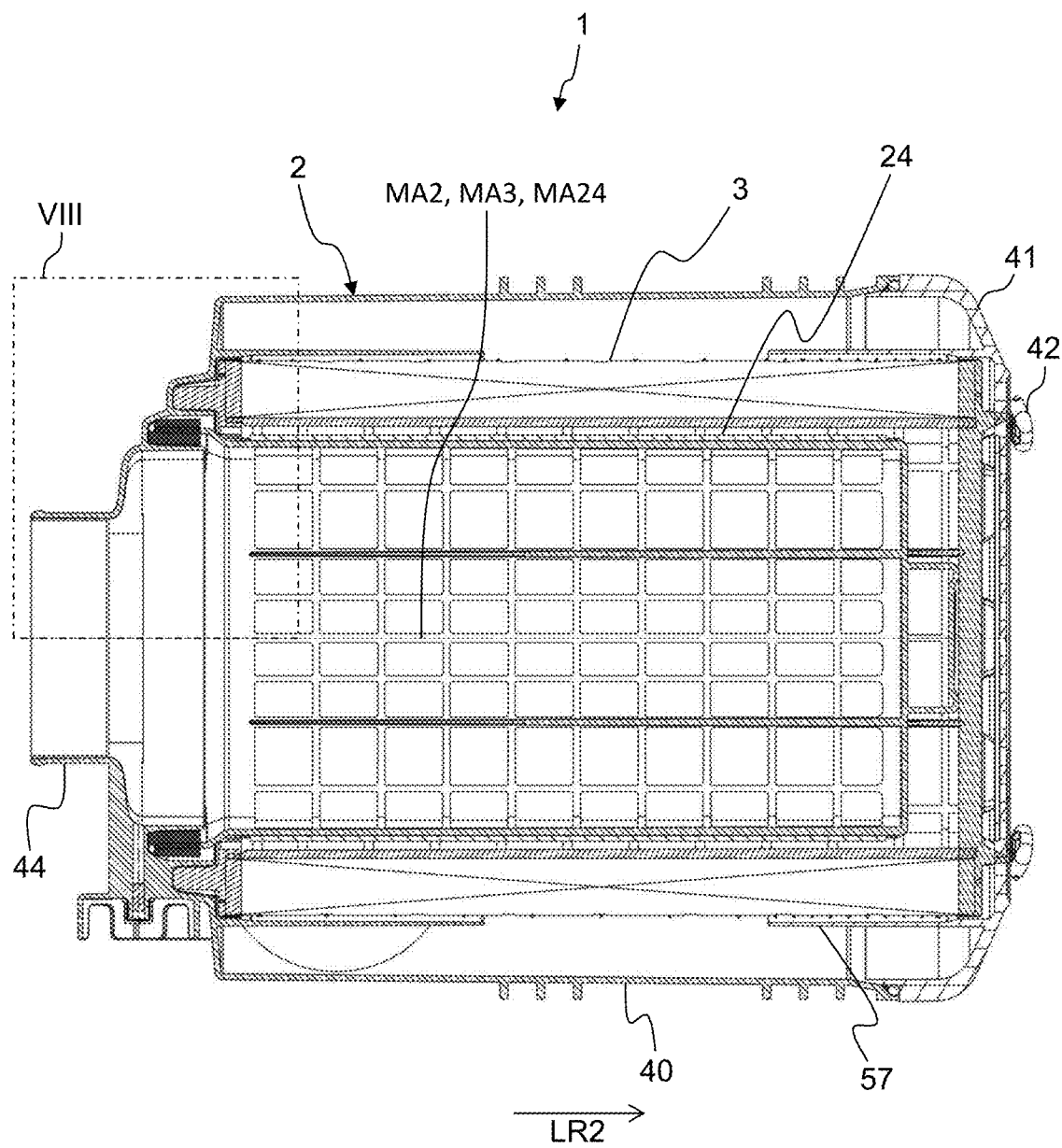
FIG. 7 shows a further schematic section view of the filter arrangement according to the section line VII-VII of FIG. 4.
Figure 8:
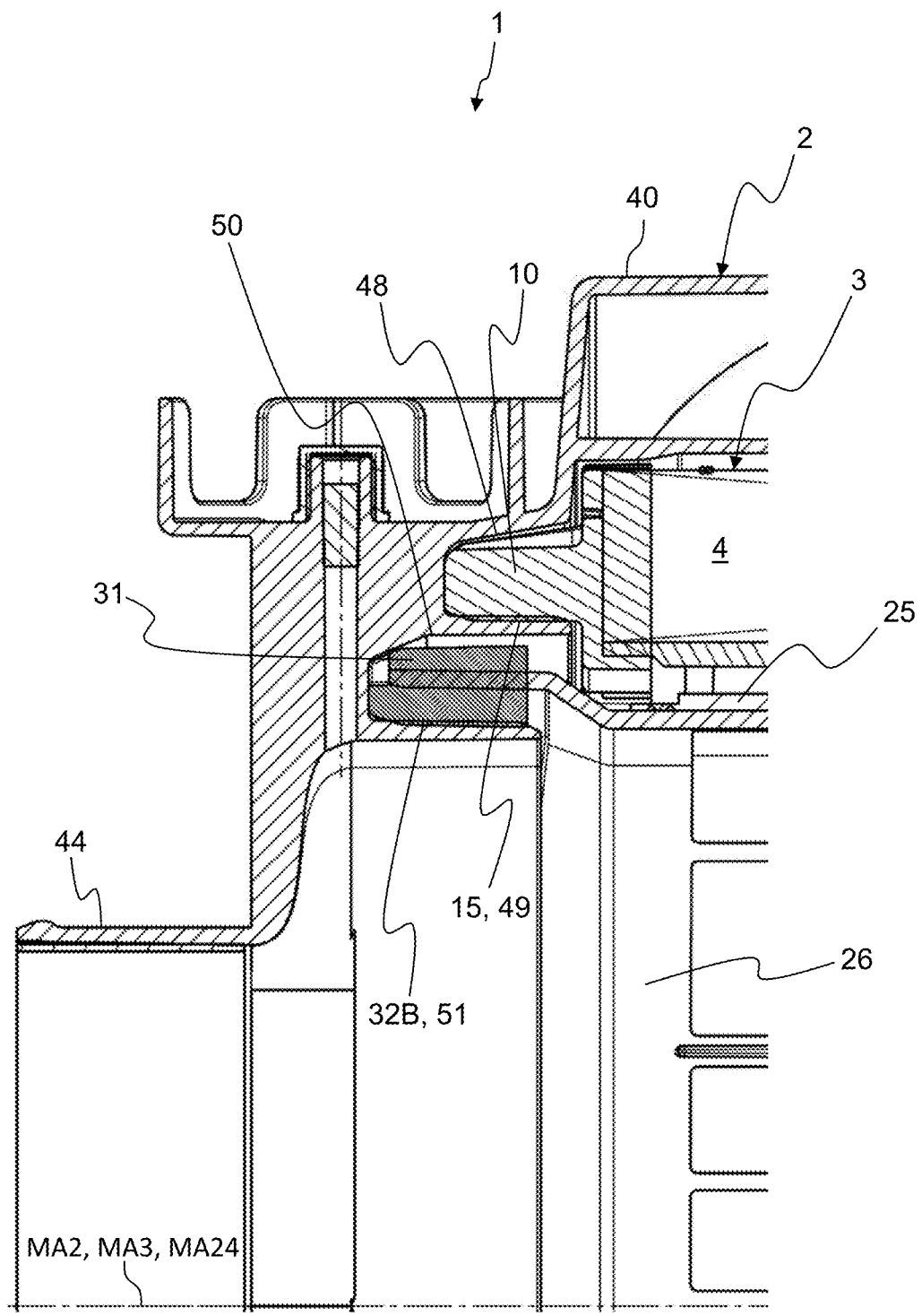
FIG. 8 shows the detail view VIII according to FIG. 7.
Figure 9:
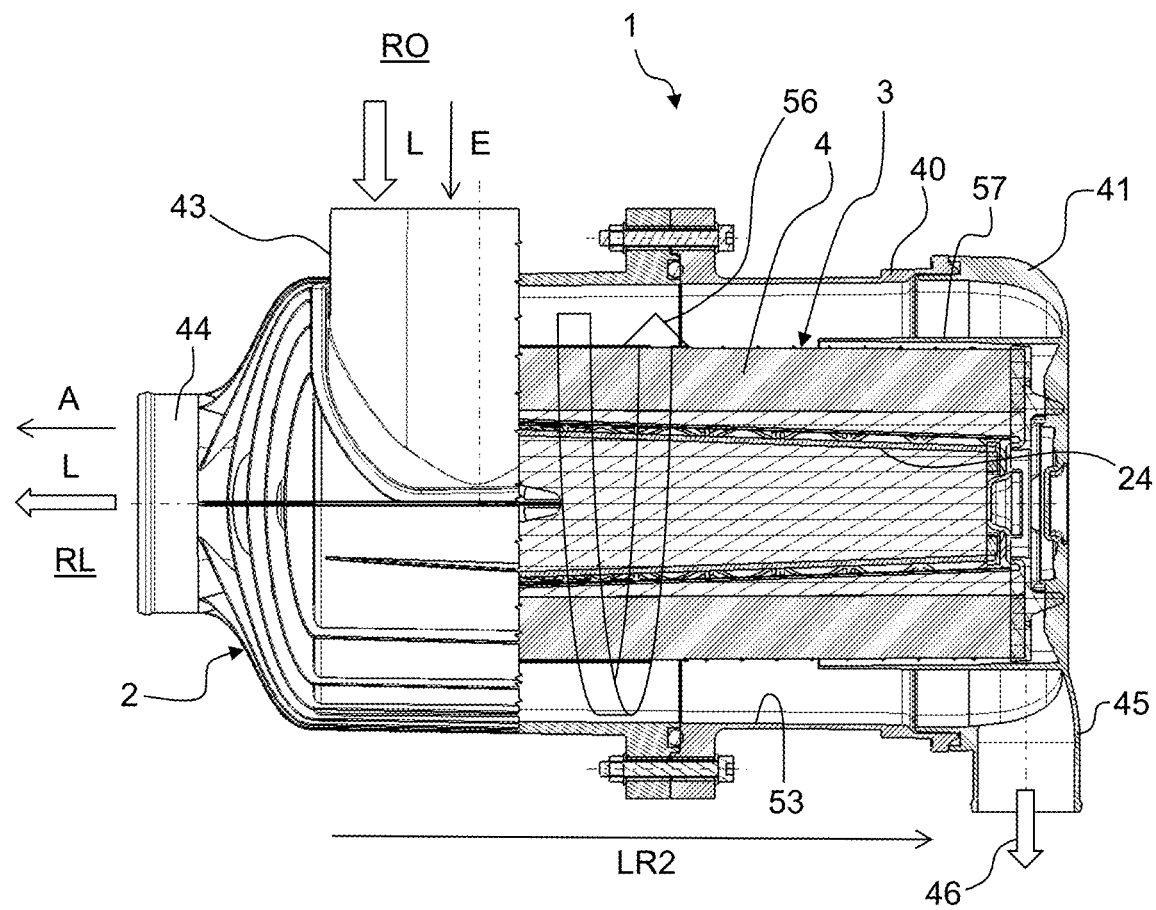
FIG. 9 shows a schematic partial section view of the filter arrangement according to FIG. 1.

FIG. 1 shows a schematic perspective view of an embodiment of a filter arrangement 1. FIG. 2 shows a front view of the filter arrangement 1. FIGS. 3 and 4 show respectively a side view of the filter arrangement 1. FIGS. 5 and 6 show respectively section views of the filter arrangement 1 according to the section line V-V and VI-VI, respectively, of FIG. 4, and FIG. 7 shows a further section view of the filter arrangement 1 according to the section line VII-VII of FIG. 4. FIG. 8 shows the detail view VIII according to FIG. 7, and FIG. 9 shows a schematic partial section view of the filter arrangement 1. In the following, reference is being had to FIGS. 1 to 9 simultaneously.

The filter arrangement 1 can also be referred to as filter system. The filter arrangement 1 comprises a filter receptacle 2 and a filter element 3 arranged in the filter receptacle 2. The filter receptacle 2 can also be referred to as housing or filter housing. The filter element 3 is shown in a schematic perspective view in FIG. 10. The filter arrangement 1 is used preferably as an intake air filter for an internal combustion engines, for example, in motor vehicles, trucks, construction vehicles, watercraft, rail vehicles, agricultural machines or vehicles, or aircraft. The filter arrangement 1 can also be used in immobile applications, for example, in building technology. The filter element 3 is in particular suited to filter combustion air of an internal combustion engine. Preferably, the filter element 3 is an air filter element.

Figure 10:
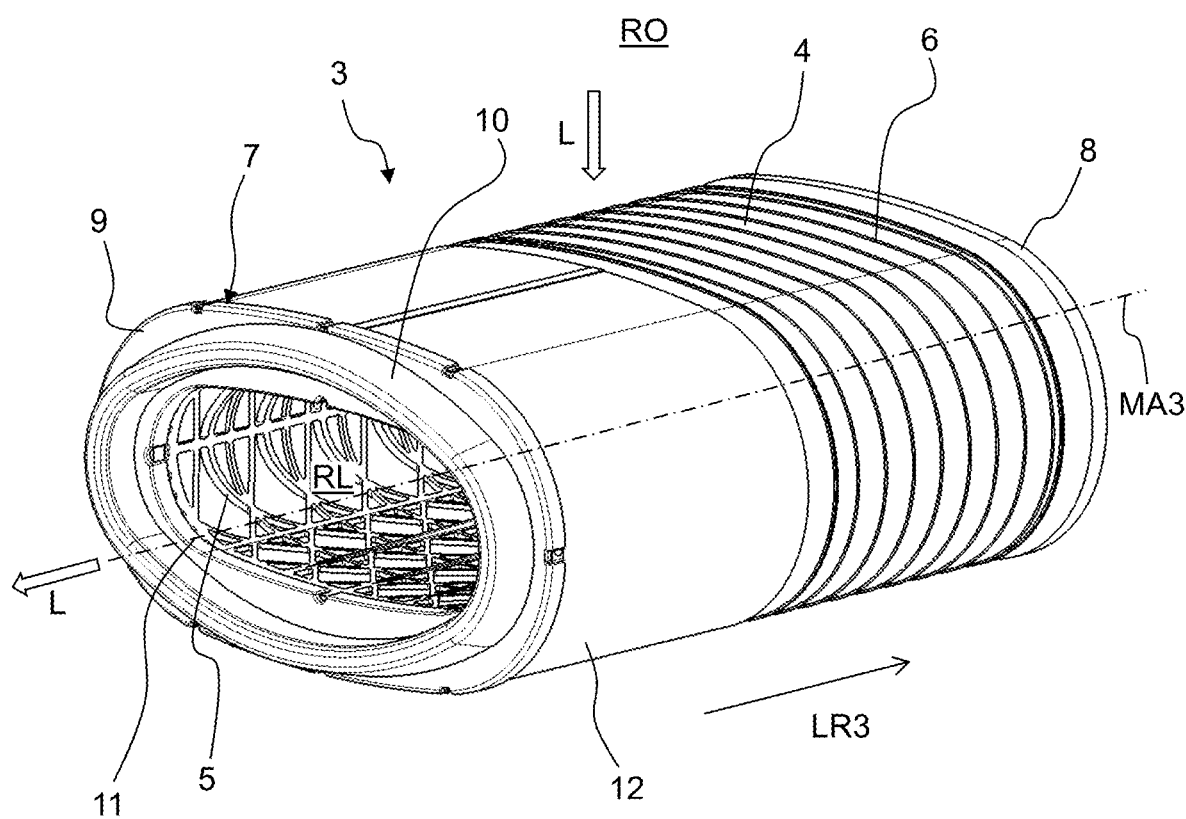
FIG. 10 shows a schematic perspective view of an embodiment of a filter element for the filter arrangement according to FIG. 1.
Figure 11:
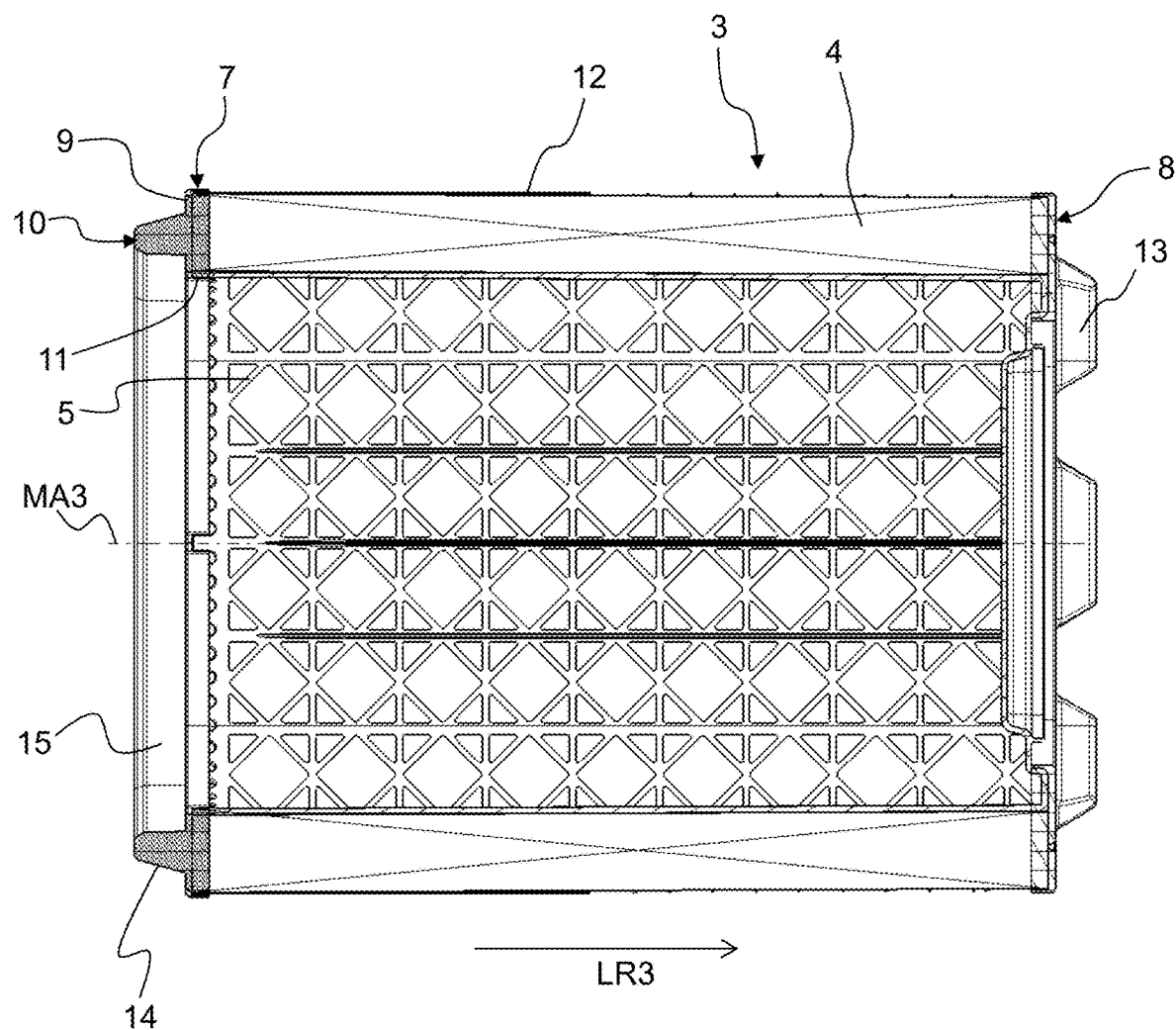
FIG. 11 shows a schematic section view of the filter element according to FIG. 10.
Figure 12:
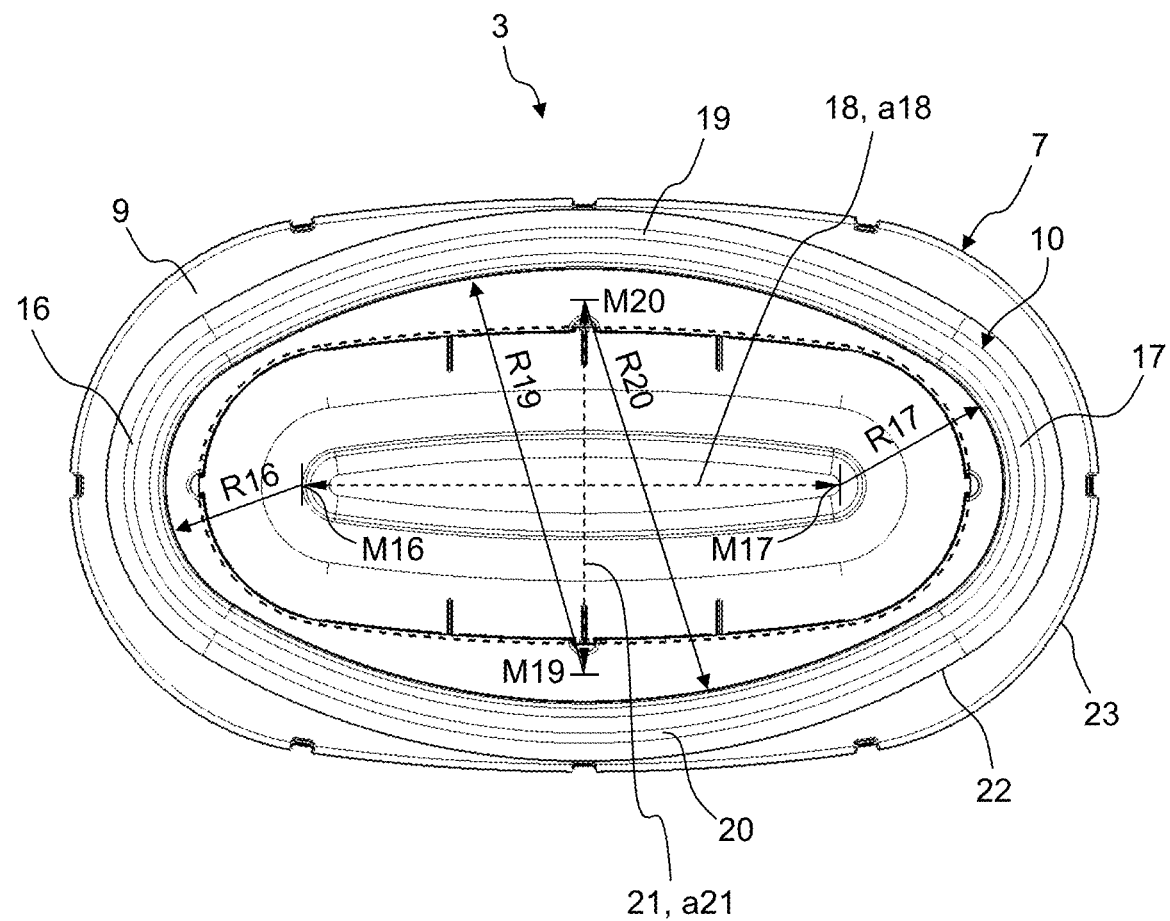
FIG. 12 shows a schematic front view of the filter element according to FIG. 10.

The filter element 3 illustrated in FIGS. 10 to 12 is a main filter element, main element, primary filter element or primary element, or can be referred to as such. Moreover, the filter element 3 can also be referred to as first filter element of the filter arrangement 1. The filter element 3 comprises a filter medium 4 that surrounds a central tube 5 and preferably contacts it such that the central tube 5 can provide a support function for the filter medium 4 upon flow therethrough. The filter medium 4 can also be referred to as filter body. The central tube 5 can also be referred to as support tube. The central tube 5 is preferably grid-shaped and thus fluid-permeable.

For example, the filter medium 4 can be wound as a coil of a filter material onto the central tube 5 or can contact it in an annular closed shape, for example, in the form of a star-shaped folded bellows. The filter medium 4 is preferably folded. For stabilization, the folded filter medium 4 can be wrapped with a fixation coil 6, i.e., a strip or thread that has been impregnated with a hot melt or another adhesive, or can be fixed by means of adhesive beads extending about the circumference in a circular or spiral shape. The fixation coil 6 can also be referred to as thread coil.

The filter medium 4 is, for example, a filter paper, a woven filter material, a laid filter material or filter nonwoven. In particular, the filter medium 4 can be produced by spunbond or melt-blown method or can comprise such a fiber layer applied onto a nonwoven or cellulose carrier. Moreover, the filter medium 4 can be felted or needled. The filter medium 4 can comprise natural fibers, such as cellulose or cotton, or synthetic fibers, for example, of polyester, polyvinyl sulfate or polytetrafluoroethylene. Fibers of the filter medium 4 can be oriented during manufacture in a machining direction, at a slant and/or transversely thereto or randomly.

The filter element 3 comprises a first, in particular open, end disk 7 and a second, in particular closed, end disk 8. The end disks 7, 8 are preferably manufactured from plastic material. For example, the end disks 7, 8 can be embodied as cost-efficient injection molded plastic components. The end disks 7, 8 can also be manufactured, for example, from polyurethane material cast in casting molds, preferably foamed. The end disks 7, 8 can be cast onto the filter medium 4. The filter medium 4 is arranged between the end disks 7, 8. The filter medium 4 can be fused, glued or welded to the end disks 7, 8.

At a front side 9 of the first end disk 7 which is facing away from the filter medium 4, a sealing device 10 for sealing the filter element 3 with respect to the filter receptacle 2 is provided. The sealing device 10 is configured to seal the filter element 3, in particular radially, with respect to the filter receptacle 2.

The second end disk 8 is, for example, plate-shaped and preferably fluid-impermeable. In the first end disk 7, a receiving opening 11 is provided through which fluid L that has been filtered by means of the filter element 3 can exit. The fluid L is preferably air. Moreover, the filter element 3 preferably comprises an inflow protection 12 which prevents a direct flow of particle-laden fluid L against the filter medium 4. The inflow protection 12 can be a film or a closed mesh net or grid. The inflow protection 12 can be fluid impermeable or fluid permeable. The inflow protection 12 can be glued, welded or fused to the filter medium 4. The inflow protection 12 is arranged neighboring the first end disk 7. In particular, the inflow protection 12 adjoins the first end disk 7. The inflow protection 12 can be connected in particular flow-tightly to the first end disk 7.

Fluid L to be purified passes from the raw side RO of the filter element 3 through the filter medium 4 to a clean side RL of the filter element 3 surrounded by the central tube 5. The fluid L flows out of the filter element 3 through the receiving opening 11 as filtered fluid L. The filter element 3 and in particular the filter medium 4 have a width b and a height h (FIG. 6). The width b is greater than the height h. Preferably the width b amounts to 2 times to 3 times the height h, further preferred the width b amounts to 1.5 times to 3 times the height h.

The filter element 3 comprises, viewed in a length direction LR3 thereof, preferably an oval cross section. The cross section, beginning at the first end disk 7, can decrease in the direction toward the second end disk 8 so that the filter element 3 tapers conically. Preferably, however, the filter element 3, as illustrated in FIGS. 10 and 11, has an oval cross section. This means that the filter element 3 is cylinder-shaped with an oval base surface.

"Oval" can be understood presently as a shape with non-concave flat outer contour, which means formed continuously of convex and straight sections, preferably exclusively of convex sections, for example, a rectangular cross section with rounded corners, an elliptical cross section or a cross section that is formed of a plurality of circular arcs. Preferably, an oval outer contour or an oval cross section is used which comprises a center point and two symmetry axes intersecting each other thereat.

The second end disk 8 can have, for example, clamping elements 13 of which in FIG. 11 only one is provided with a reference character. The clamping elements 13 can be elastically deformable projections projecting in the length direction LR3 away from the second end disk 8 by means of which the filter element 3 can be elastically clamped in the filter receptacle 2. The number of clamping elements 13 is arbitrary. By means of the elastically deformable clamping elements 13, the filter element can be optimally positioned in the filter receptacle 2 with regard to the length direction LR3. The clamping elements 13 serve moreover for vibration damping and/or tolerance compensation. The second end disk 8 is preferably formed monolithically together with the clamping elements 13. For example, the second end disk 8 together with the clamping elements 13 can be formed from a polyurethane foam.

At the first end disk 7 and in particular at the front side 9 of the first end disk 7 which is facing away from the filter medium 4, the elastically deformable sealing device 10 for sealing the filter element 3 with respect to the filter receptacle 2 is provided. The sealing device 10 is resiliently deformable. Preferably, the first end disk 7 and the sealing device 10 are embodied monolithically. For example, the first end disk 7 and the sealing device 10 can be manufactured from a polyurethane foam. The sealing device 10 surrounds the first end disk 7 completely. The sealing device 10 is located, in particular in a projection in the length direction LR3, completely inside a cross section of the filter medium 4. As shown also in FIG. 11, the sealing device 10 comprises an outer circumferential surface 14 that is facing away from the central tube 5 as well as an inner surface 15 that is facing away from the outer surface 14 and also surrounds completely the filter element 3. The sealing device 10 comprises an oval geometry or an oval cross section.

The sealing device comprises, as shown in FIG. 12, two first convex curved sections 16, 17 that are arranged opposite each other. The first curved sections 16, 17 comprises each a first radius of curvature R16, R17. The first radii of curvature R16, R17 are preferably of the same size. The first radii of curvature R16, R17 comprise first curvature center points M16, M17. The first curvature center points M16, M17 are positioned on a common long side 18 of the sealing device 10. The long side 18 can also be referred to as long side of the oval geometry of the sealing device 10. The long side 18 is a straight line. The long side 18 can furthermore be referred to as major axis of the sealing device 10 or as major axis of the oval geometry of the sealing device 10. Between the curvature center points M16, M17, the long side 18 has a length a18.

The sealing device 10 comprises moreover two second convex curved sections 19, 20 that are arranged opposite each other. The first curved sections 16, 17 and the second curved sections 19, 20 are connected to each other monolithically. The second curved sections 19, 20 comprise second radii of curvature R19, R20 with second curvature center points M19, M20. The second radii of curvature R19, R20 are preferably of the same size. The second radii of curvature R19, R20 are larger than the first radii of curvature R16, R17. The second curvature center points M19, M20 of the second radii of curvature R19, R20 are positioned on a common short side 21 of the sealing device 10. The short side 21 can also be referred to as short side of the oval geometry of the sealing device 10. The short side 21 is a straight line. The short side 21 can moreover be referred to as minor axis of the sealing device 10 or as minor axis of the oval geometry of the sealing device 10. Between the curvature center points M19, M20, the short side 21 has a length a21. The length a18 is larger than the length a21.

The short side 21 is arranged perpendicularly to the long side 18. Preferably, the short side 21 divides the long side 18 centrally, and vice versa. Preferably, the short side 21 and the long side 18 intersect each other at a point of intersection through which, viewed in the length direction LR3, a center axis MA3 of the filter element 3 is extending which is preferably positioned, when the filter element 3 is installed in the filter receptacle 2, in overlap with a center axis MA2 (FIGS. 3 and 4) of the filter receptacle 2. In this context, the center axis MA3 is parallel to the length direction LR3. The first curved sections 16, 17 are positioned mirror-symmetrically in relation to the short side 21, and the second curvature sections 19, 20 mirror-symmetrically positioned in relation to the long side 18. The sealing device 10 comprises moreover an outer contour 22 at the outer surface 14. The outer contour 22 preferably does not extend parallel to an outer contour 23 of the first end disk 7.

In the filter receptacle 2, surrounded by the filter element 3, an additional filter element 24 as shown in FIGS. 13 to 17 can be received. The filter element 24 is an auxiliary filter element, auxiliary element, secondary filter element or secondary element or can be referred to as such. Moreover, the filter element 24 can also be referred to as second filter element of the filter arrangement 1. Such secondary filter elements serve in particular as a safety means for the cases that an operator opens the filter receptacle 2 while the engine is running and removes the filter element 3, for example, for dust removal or exchange.

Figure 16:
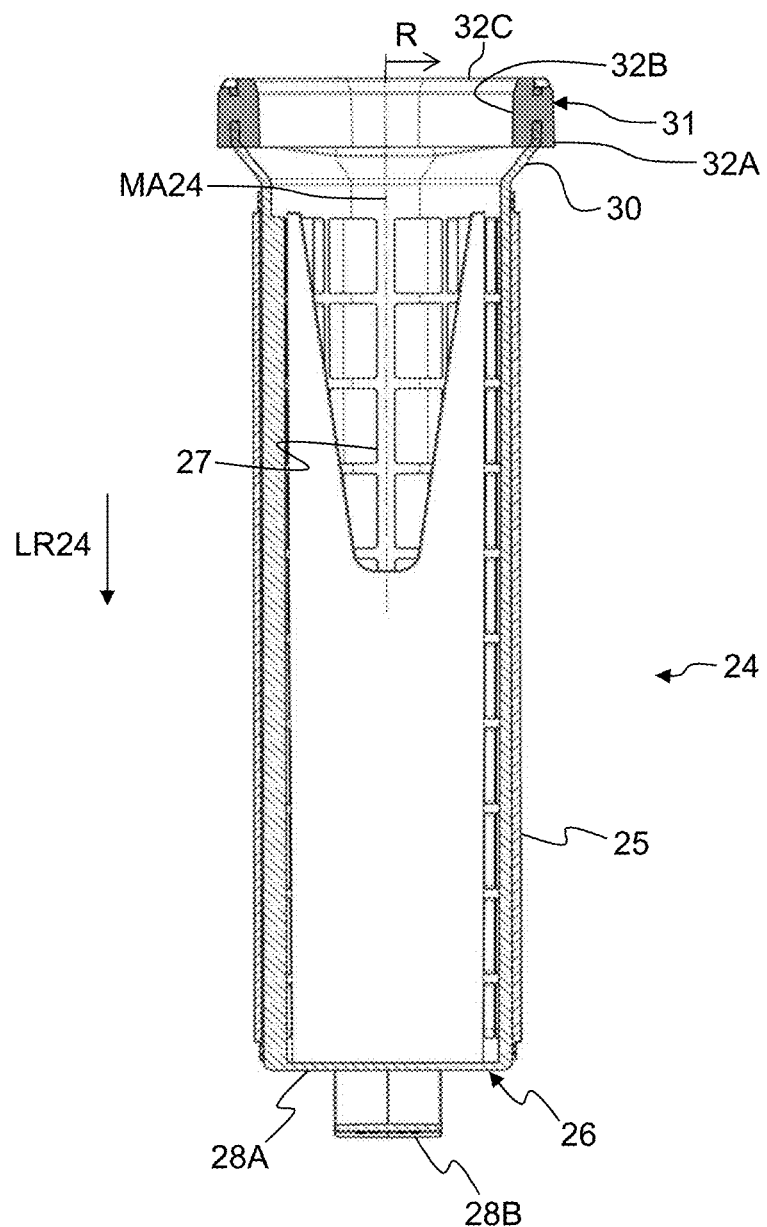
FIG. 16 shows a schematic section view of the filter element according to the section line XVI-XVI of FIG. 13.
Figure 17:
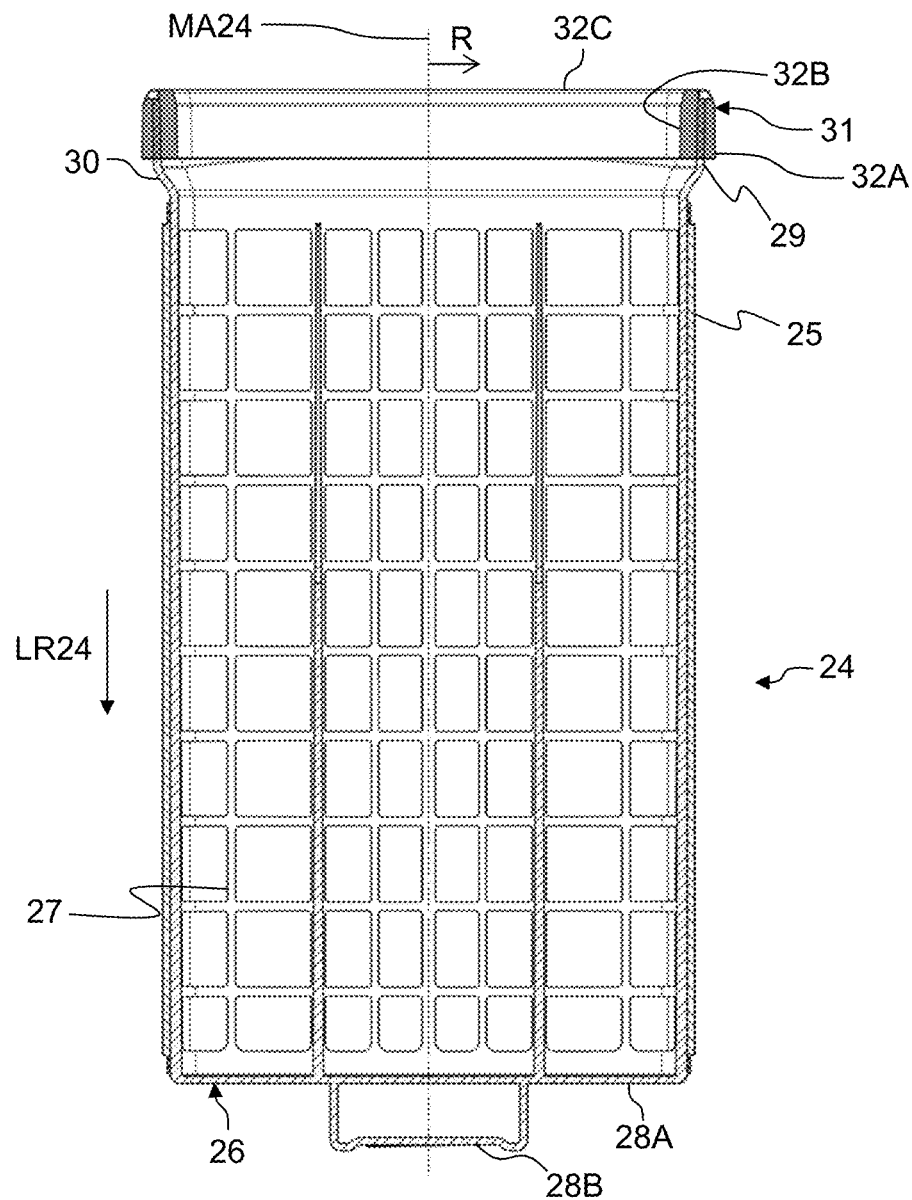
FIG. 17 shows a further schematic section view of the filter element according to the section line XVII-XVII of FIG. 13.

Preferably, the filter element 24 is received in the receiving opening 11 of the filter element 3. The filter element 24 comprises a filter medium 25 as well as a central tube 26 that supports the filter medium 25. The central tube 26 is preferably grid-shaped and thus fluid-permeable. The filter medium 25 can be wound as a coil onto the central tube 26 or can contact it in an annular closed shape, for example, in the form of a star-shaped folded bellows. The filter medium 25 is however preferably flat and thus not folded, as shown in FIGS. 16 and 17.

The filter medium 25 is, for example, a filter paper, a woven filter material, a laid filter material or a filter nonwoven. In particular, the filter medium 25 can be produced by a spunbond or melt-blown method or can comprise such a fiber layer applied onto a nonwoven or cellulose carrier. Moreover, the filter medium 25 can be felted or needled. The filter medium 25 can comprise natural fibers, such as cellulose or cotton, or synthetic fibers, for example, of polyester, polyvinyl sulfate, or polytetrafluoroethylene. Fibers of the filter medium 25 can be oriented during manufacture in a machining direction and/or transverse thereto or randomly.

The central tube 25 comprises a grid-shaped support section 27 which is fluid-permeable and supports the filter medium 25. At the end face, the support section 27 is closed by a fluid-tight bottom section 28A. In this context, the bottom section 28A is preferably formed monolithically with the support section 27. A support element 28B can be integrally formed at the bottom section 28A. The support element 28B in the mounted state of the filter element 24 can be supported on the second end disk 8 of the filter element 3.

The support section 27 is oval in cross section. In addition to the support section 27 and the bottom section 28A, the central tube 26 comprises a sealing section 29 (FIG. 17) which in cross section is also oval. Circumferentially about the filter element 24, the sealing section 29 projects radially past the support section 27. "Radial" is to be understood herein as a direction, in particular a radial direction R, perpendicular to and pointing away from a center axis MA24 of the filter element 24. The center axis MA24 extends in this context parallel to a length direction LR24 of the filter element 24.

Between the sealing section 29 and the support section 27, a connecting section 30 is provided. The connecting section 30 connects the sealing section 29 monolithically to the support section 27. In this context, the connecting section 30 is oval in cross section and tapers conically, beginning at the sealing section 29, in the direction toward the support section 27. Preferably, the central tube 26 is a one piece, in particular monolithic, injection molded plastic component.

The filter element 24 comprises moreover a sealing device 31. The sealing device 31 is elastically deformable. For example, the sealing device to 31 is manufactured from a polyurethane material. The sealing device 31 is integrally formed at the sealing section 29 of the central tube 26 or is cast onto it. The sealing device 31 comprises an outer surface 32A extending circumferentially about the center axis MA24, a circumferentially extending inner surface 32B facing away from the outer surface 32A, as well as a circumferentially extending end face 32C. The sealing device 31 comprises in this context an oval geometry or an oval cross section.

Figure 13:
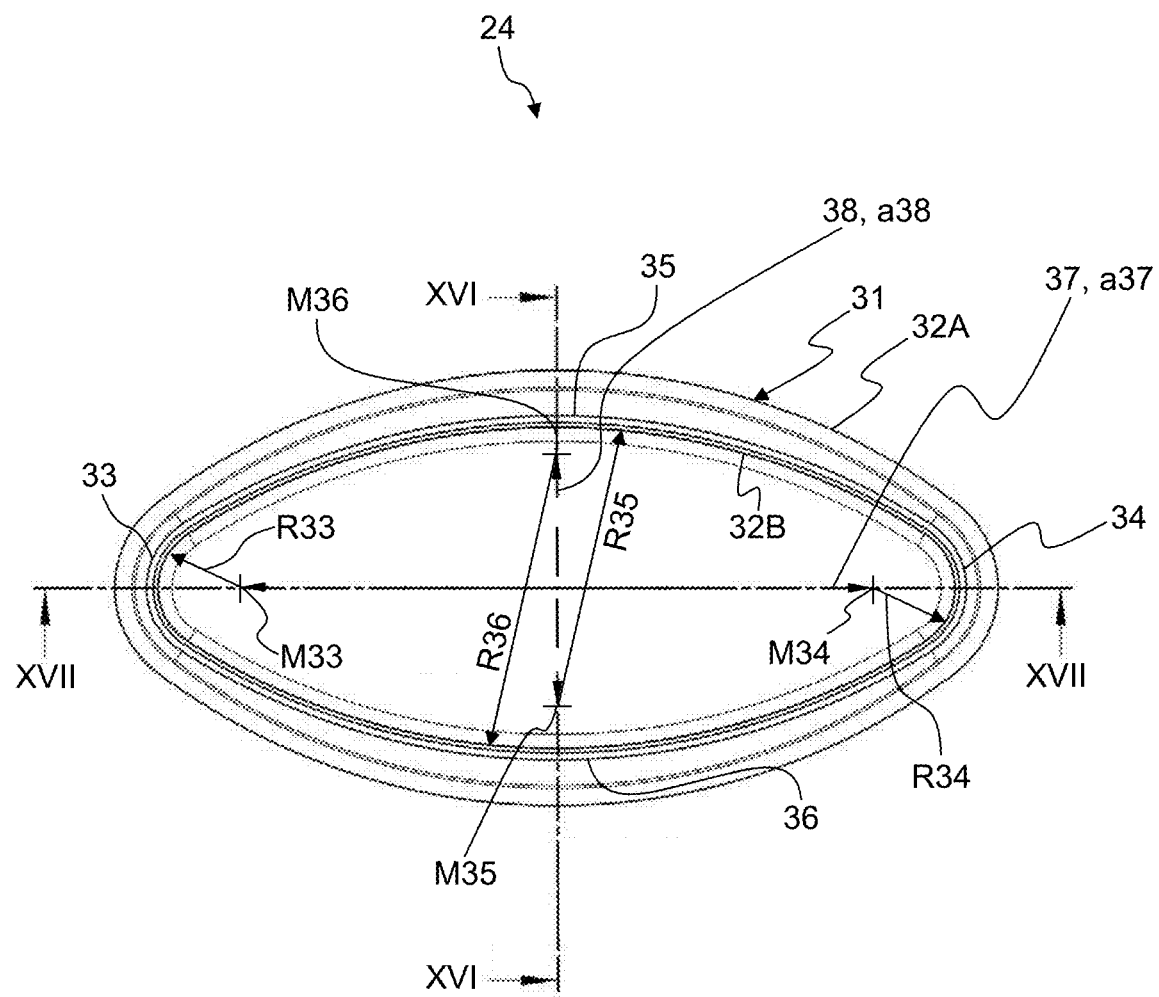
FIG. 13 shows a schematic front view of an embodiment of a further filter element for the filter arrangement according to FIG. 1.

As shown in FIG. 13, the sealing device 31 comprises two first convex curved sections 33, 34 that are positioned opposite each other as well as two second convex curved sections 35, 36 that are positioned opposite each other. The first curved sections 33, 34 are monolithically embodied with the second curved sections 35, 36 wherein the curved sections 33 to 36 are arranged such that between the two first curved sections 33, 34 the two second curved sections 35, 36 and between the two second curved sections 35, 36 the two first curved sections 33, 34 are arranged.

The first curved sections 33, 34 each comprise a first radius of curvature R33, R34. The first radii of curvature R33, R34 are preferably of the same size. The first radii of curvature R33, R34 comprise first curvature center points M33, M34. The first curvature center points M33, M34 are positioned on a common long side 37. The long side 37 can also be referred to as long side of the oval geometry of the sealing device 31. The long side 37 is a straight line. The long side 37 can moreover be referred to as major axis of the sealing device 31 or as major axis of the oval geometry of the sealing device 31. Between the first curvature center points M33, M34, the long side 37 has a length a37.

The second curved sections 35, 36 comprise second radii of curvature R35, R36. The second radii of curvature R35, R36 are of the same size. Second curvature center points M35, M36 of the second radii of curvature R35, R36 are positioned on a common short side 38. The short side 38 can also be referred to as short side of the oval geometry of the sealing device 31. The short side 38 is a straight line. The short side 38 can moreover be referred to as minor axis of the sealing device 31 or as minor axis of the oval geometry of the sealing device 31. Between the second curvature center points M35, M36, the short side 38 has a length a38. The length a37 is larger than the length a38.

Preferably, the long side 37 divides the short side 38 centrally, and vice versa. Preferably, the short side 38 and the long side 37 intersect at a point of intersection through which, viewed in the length direction LR24, the center axis MA24 is extending which is preferably positioned, when the filter element 24 is installed in the filter receptacle 2, in overlap with the center axis MA2 of the filter receptacle 2 as well as the center axis MA3 of the filter element 3. The first curved sections 33, 34 are positioned mirror-symmetrically with respect to the short side 38, and the second curved sections 35, 36 are mirror-symmetrically positioned with respect to the long side 37.

Figure 14:
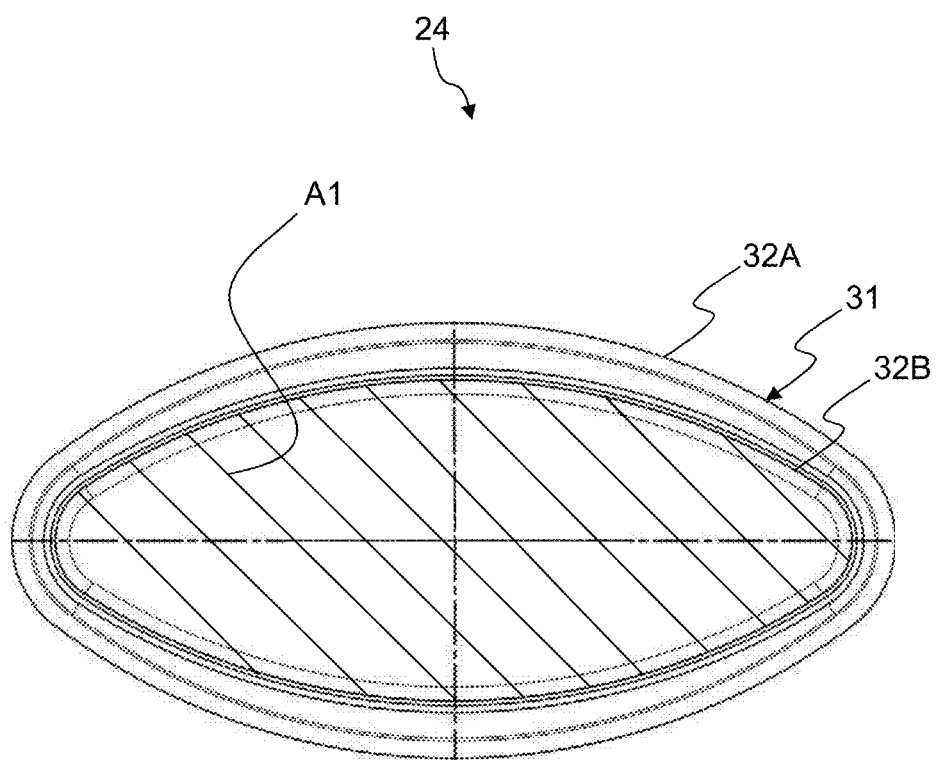
FIG. 14 shows a further schematic front view of the filter element according to FIG. 13.
Figure 15:
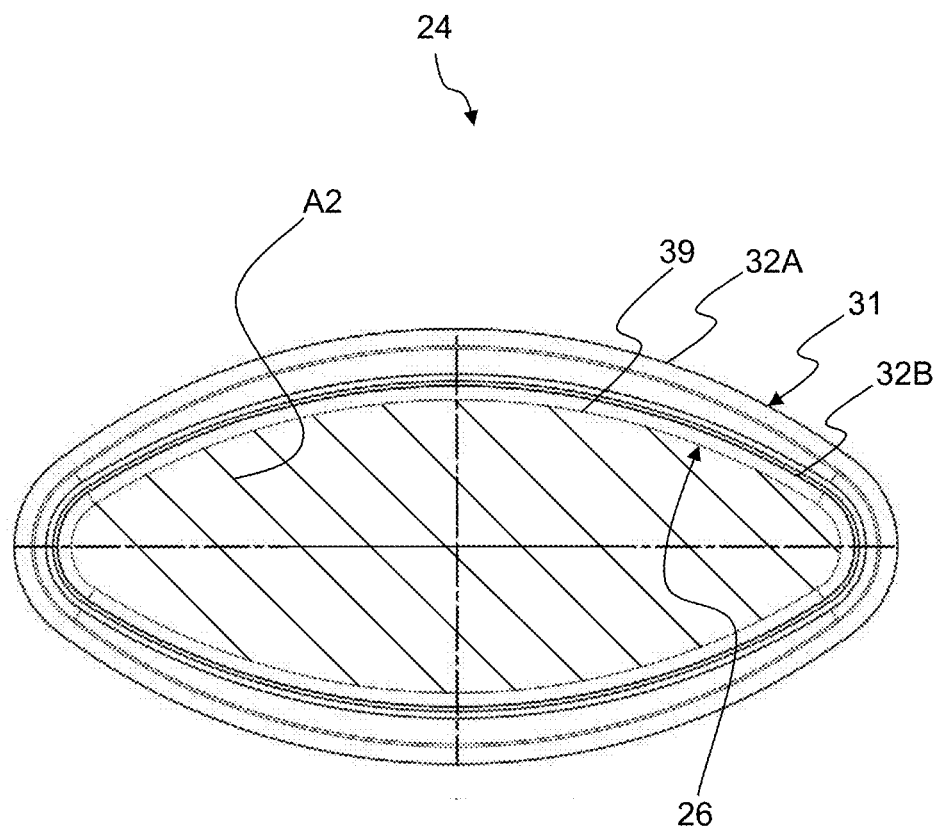
FIG. 15 shows a further schematic front view of the filter element according to FIG. 13.

As shown in FIG. 14, the inner surface 32B of the sealing device 31 delimits a first cross section surface A1 of the filter element 24. As shown in FIG. 15, an inner contour 39 of the central tube 26 delimits a second cross section surface A2 of the filter element 24. In this context, the first cross section surface A1 is larger than the second cross section surface A2. The second cross section surface A2 can also be referred to as outflow cross section of the filter element 24. Since the first cross section surface A1 is larger than the second cross section surface A2, the sealing device 31 does not delimit the second cross section surface A2 and thus also does not delimit the outflow cross section of the filter element 24.

The sealing device 31 projects, viewed in the radial direction R, circumferentially past the filter medium 25. In this way, in comparison to a filter element without such a projecting sealing device 31, the radii of curvature R33 to R36 can be selected larger whereby an improved sealing action with respect to the filter receptacle 2 results. Viewed along the short side 38, the inner surface 32B of the sealing device 31 projects radially farther past the inner contour 39 of the central tube 26 than viewed along the long side 37. Accordingly, also the outer surface 32A of the sealing device 31, viewed along the short side 38, projects radially farther past the filter medium 25 than viewed along the long side 37.

Returning now to the filter arrangement 1 according to FIGS. 1 to 9. The filter receptacle 2 comprises a receiving section 40. The receiving section 40 can be embodied as one piece or as a multi-part configuration. The receiving section 40 is preferably manufactured from a plastic material. Alternatively, the receiving section 40 can be manufactured from sheet metal, in particular sheet steel. For example, the receiving section 40 can be embodied as a cost-efficient injection molded plastic component. FIGS. 1 to 3 and 9 show a different possibility of configuring the receiving section 40 in comparison to FIGS. 4 to 8.

Moreover, the filter receptacle comprises a service cover 41 removable from the receiving section 40. By means of the service cover 41, the filter elements 3, 24 can be removed from the receiving section 40. The service cover 41 can be connected by means of quick connect devices 42 to the receiving section 40. Between the service cover 41 and the receiving section 40, a sealing device can be provided. FIGS. 2 and 3 show the filter arrangement 1 in two different installation situations, namely in a horizontal one and an upright one.

The filter receptacle 2 or the receiving section 40 comprises a fluid inlet 43 for inflow of the fluid L to be filtered into the filter receptacle 2 and an in particular central fluid outlet 44 for outflow from the filter receptacle 2 of the fluid L that has been filtered by means of the filter element 3. The fluid inlet 43 and the fluid outlet 44 are preferably embodied tubular. The fluid inlet 43, as shown in FIGS. 1 and 3, can comprise an oval cross section. By means of the oval cross section, whose wider expansion is preferably oriented in the direction of a length direction LR2 of the filter receptacle 2, a reduced initial pressure loss can be achieved in comparison to a circular cross section.

The fluid L to be filtered enters the fluid inlet 43 in a flow direction E. The fluid outlet 44 comprises preferably a circular cross section. The fluid L exits from the fluid outlet 44 in an outflow direction A preferably parallel to the length direction LR3 of the filter element 3 or of the length direction LR2 of the filter receptacle 2. The inflow direction E is oriented perpendicularly to the outflow direction A.

A particle discharge opening 45 can be provided at the service cover 41. The particle discharge opening 45 is preferably tubular. By means of the particle discharge opening 45, particles 46 (FIG. 9) that have been separated from the fluid L can be discharged from the filter receptacle 2. The particle discharge opening 45 can comprise a valve 47, in particular a lip valve or a so-called duckbill valve. The particles 46 can comprise, for example, dust, soil, sand, plant parts or the like.

In the filter receptacle 2 and in particular in the receiving section 40, a first engagement region 48 (FIG. 8) is provided which is engaged by the sealing device 10 of the filter element 3. This first engagement region 48 comprises preferably a seal contact surface 49 that can be contacted seal-tightly by the sealing device 10 with the inner surface 15. In the present embodiment, preferred as shown, an oval cylinder-shaped, radially outwardly oriented seal contact surface 49 is provided which follows the course of the inner surface 15 of the sealing device 10.

Furthermore, at the receiving section 40 a second engagement region 50 can be provided which is engaged by the sealing device 31 of the filter element 24. This second engagement region 50 comprises preferably also a seal contact surface 51 that can be contacted seal-tightly by the sealing device 31 with its inner surface 32B. In the present embodiment, preferred as shown, an oval cylinder-shaped, radially outwardly oriented seal contact surface 51 is provided. The engagement regions 48, 50 surround the fluid outlet 44 completely. The engagement regions 48, 50 have an oval geometry. The second engagement region 50 is positioned inside the first engagement region 48.

As shown in FIG. 5, the fluid inlet 43 is arranged such that the inflow direction E of the fluid L is oriented in the direction toward an outer wall surface 52 and perpendicularly to the length direction LR3 of the filter element 3 arranged in the receiving section 40. The outer wall surface 52 forms an envelope of the filter element 4 of the filter element 3. A cylindrical, in particular oval cylindrical, geometry of the filter element 3 is formed by the end disks 7, 8 and the outer wall surface 52. An inner wall surface of the filter medium 4 is defined by the central tube 5. The fluid L to be filtered flows about the filter element 3 received in the receiving section 40 such that particles 46 contained in the fluid L to be filtered are separated by means of the centrifugal force at a wall 53 of the filter receptacle 2 or of the receiving section 40. The receiving section 40 acts as a centrifugal separator. In particular, the inflow direction E is oriented such that the fluid L to be filtered flows substantially tangentially about the filter element 3.

The receiving section 40 comprises in cross section preferably a width direction br and a height direction hr. A width/height ratio b/h amounts preferably to at least 4:3, further preferred at least 3:2, in particular at least 2:1, and/or at most 6:1, preferably at most 4:1, particularly preferred at most 3:1 or 2:1. For the purposes of an optimized preseparation, ratios of smaller than 3:1 and preferably smaller than 2:1 or even smaller than 1.5:1 are advantageous. Preferably, the fluid inlet 43 is arranged such that the inflow direction E is oriented perpendicularly to the width direction br, i.e., preferably perpendicularly to the direction of the wider expansion of the filter element 3.

Since the fluid inlet 43 is preferably oriented such that the inflowing fluid L impinges on a comparatively more strongly curved curvature 54 of the wall 53 of the receiving section 40, the fluid L to be filtered is strongly accelerated and flows subsequently about the filter element 3 tangentially and in particular in a screw shape, spirally or helically. In this way, a good separation of the particles 46 from the fluid L is achieved.

The fluid inlet 43 can be shielded by means of a wall 55 from the fluid L flowing about the filter element 3. The wall 55 supports the formation of a screw-shaped flow about the filter element 3. The separated particles 46 are removed by means of the particle discharge opening 45 from the receiving section 40.

The receiving section 40 extends in the length direction LR3 of the filter element 3 parallel to the outer wall surface 52 of the filter element 3 so that, as shown in FIG. 6, perpendicular to the length direction LR3, a uniform distance a between filter element 3 and the wall 53 is provided circumferentially about the filter element 3.

FIG. 9 shows a partial section view of the filter arrangement 1. The fluid L to be filtered flows through the fluid inlet 43 into the receiving section 40. Since the inflow direction E of the fluid L to be filtered is oriented in the direction toward the outer wall surface 52 of the filter element 3 and in particular also perpendicularly to the length direction LR3, the fluid L to be filtered flows, as shown in FIG. 9 by means of arrow 56, in a screw shape about the filter element 3 and flows through the filter medium 4 of the filter element 3 to then flow out from the fluid outlet 44 of the filter receptacle 2 in the outflow direction A as filtered fluid L.

Upon flowing about the filter element 3, the particles 46 are separated from the fluid L to be filtered at the wall 53 of the receiving section 40 by means of the centrifugal force and can be removed through the particle discharge opening 45 from the receiving section 40. The particles 46 can be discharged, for example, by means of the valve 47, from the particle discharge opening 45. The valve 47 can be controlled, for example, by a load change of an internal combustion engine connected to the filter arrangement 1. In comparison to a circular cross section, a beneficial particle separation with simultaneous suitability of the filter arrangement 1 for installation spaces that do not have a circular or square cross section is realized due to the oval cross section geometry of the receiving section 40.

As furthermore shown in FIGS. 6, 7, and 9, the service cover 41 comprises a tubular, in particular oval tubular, inflow protection 57 in which the filter element 3 is at least partially received, preferably such that between the filter element 3 and the inflow protection 57 a flow gap of a few millimeters is provided. The inflow protection 57 can be embodied monolithically with the service cover 41 and prevents in particular that particles 46, pre-separated due to the rotating flow, might still impact on the filter medium 4, for example, due to effects of gravity.

After demounting the service cover 41, the filter element 3 can be pulled out of the receiving section 40. The filter element 24 remains in the receiving section 40 upon exchange or cleaning of the filter element 3 and ensures that the raw side RO and the clean side RL remain separated from each other by means of the filter medium 25. Since the sealing device 31 projects outwardly in the radial direction R, an outflow cross section of the filter element 3 is not constricted by the sealing device 31. Preferably, the sealing device 31 projects in the mounted state at least in sections, in particular viewed along the short side 38, radially past an inner wall surface of the filter medium 4 or the central tube 5 of the filter element 3, at least however past the inner side of the open end disk 7, i.e., as shown In the present embodiment past the inner side of the receiving opening 11.

REFERENCE CHARACTERS 1 filter arrangement
2 filter receptacle
3 filter element
4 filter medium
5 central tube
6 fixation coil
7 end disk
8 end disk
9 front side
10 sealing device
11 receiving opening
12 inflow protection
13 clamping element
14 outer surface
15 inner surface
16 curved section
17 curved section
18 long side
19 curved section
20 curved section
21 short side
22 outer contour
23 outer contour
24 filter element
25 filter medium
26 central tube
27 support section
28A bottom section
28B support element
29 sealing section
30 connecting section
31 sealing device
32A outer surface
32B inner surface
32C end face
33 curved section
34 curved section
35 curved section
36 curved section
37 long side
38 short side
39 inner contour
40 receiving section
41 service cover
42 quick connect device
43 fluid inlet
44 fluid outlet
45 particle discharge opening
46 particles
47 valve
48 engagement region
49 seal contact surface
50 engagement region
51 seal contact surface
52 wall surface
53 wall
54 curvature
55 wall
56 arrow
57 inflow protection
a distance
a18 length
a21 length
a37 length
a38 length
A outflow direction
A1 cross section surface
A2 cross section surface
b width br width direction
E inflow direction
h height
hr height direction
L fluid
LR2 length direction
LR3 length direction
LR24 length direction
MA2 center axis
MA3 center axis
MA24 center axis
M16 curvature center point
M17 curvature center point
M19 curvature center point
M20 curvature center point
M33 curvature center point
M34 curvature center point
M35 curvature center point
M36 curvature center point
R radial direction
RL clean side
RO raw side
R16 radius of curvature
R17 radius of curvature
R19 radius of curvature
R20 radius of curvature
R33 radius of curvature
R34 radius of curvature
R35 radius of curvature
R36 radius of curvature

What is claimed is:

1. A secondary filter element for a filter arrangement, the secondary filter element comprising:
a filter medium;
a circumferentially extending sealing device configured to seal the secondary filter element in respect to a filter receptacle of the filter arrangement;
wherein the circumferentially extending sealing device comprises an oval geometry with a long side and a short side;
wherein the circumferentially extending sealing device comprises an outer surface projecting, in a radial direction of the secondary filter element, farther past the filter medium when viewed along the short side compared to when viewed along the long side.

2. The secondary filter element according to claim 1, further comprising a central tube configured to support the filter medium, wherein the circumferentially extending sealing device is connected to the central tube, and wherein a first cross section surface of the secondary filter element is delimited by an inner surface of the circumferentially extending sealing device, and wherein a second cross section surface of the secondary filter element is delimited by an inner contour of the central tube, wherein the first cross section surface is larger than the second cross section surface.

3. The secondary filter element according to claim 2, wherein the inner surface of the circumferentially extending sealing device projects in the radial direction farther past the inner contour of the central tube when viewed along the short side compared to when viewed along the long side.

4. The secondary filter element according to claim 2, wherein the central tube comprises a support section configured to support the filter medium, a sealing section connected to the circumferentially extending sealing device, and a connecting section arranged between the support section and the sealing section, wherein the connecting section tapers conically, beginning at the sealing section, in a direction toward the support section.

5. The secondary filter element according to claim 1, wherein the circumferentially extending sealing device comprises two first curved sections positioned opposite each other and further comprises two second curved sections positioned opposite each other, and wherein a radius of curvature of the second curved sections is larger than a radius of curvature of the first curved sections.

6. The secondary filter element according to claim 5, wherein the first curved sections are correlated with the long side, wherein the second curved sections are correlated with the short side, and wherein the second curved sections, viewed along the short side, project in the radial direction farther past the filter medium than the first curved sections, viewed along the long side.

7. A filter arrangement comprising:
a filter receptacle;
a main filter element received in the filter receptacle, the main filter element comprising a filter medium and a circumferentially extending sealing device configured to seal the main filter element with respect to the filter receptacle;
a secondary filter element according to claim 1 received in the main filter element;
wherein the circumferentially extending sealing device of the secondary filter element projects in a radial direction of the secondary filter element outwardly past an interior of the main filter element.

8. The filter arrangement according to claim 7, wherein the outer surface of the circumferentially extending sealing device of the secondary filter element projects, in the radial direction of the secondary filter element, farther past the filter medium of the main filter element when viewed along the short side compared to when viewed along the long side.

9. The filter arrangement according to claim 7, wherein the circumferentially extending sealing device of the secondary filter element is arranged completely outside of the filter medium of the main filter element in the radial direction of the secondary filter element.

10. The filter arrangement according to claim 7, wherein the circumferentially extending sealing device of the main filter element and the circumferentially extending sealing device of the secondary filter element seal radially with respect to the filter receptacle, and wherein the circumferentially extending sealing device of the secondary filter element at least in sections is arranged radially inside the circumferentially extending sealing device of the main filter element.

11. The filter arrangement according to claim 7, wherein the circumferentially extending sealing device of the main filter element and the circumferentially extending sealing device of the secondary filter element extend parallel to each other.

* * * * *